US 8,046,428 B2
Oct. 25, 2011

(54) PRESENTING VIDEO CONTENT WITHIN A WEB PAGE

(75) Inventors: Robert E. Moyer, Redmond, WA (US); Christopher J. Harig, Redmond, WA (US); Curtis N. Von Veh, Redmond, WA (US); James S. Hansen, Woodinville, WA (US); Kamesh C. Tumsi Dayakar, Redmond, WA (US); Marc C. Williams, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 1231 days.

(21) Appl. No.: 11/492,542

(22) Filed: Jul. 25, 2006

(65) Prior Publication Data

US 2008/0028037 A1    Jan. 31, 2008

(51) Int. Cl.
*G06F 15/16*    (2006.01)
(52) U.S. Cl. ........ 709/217; 709/224; 709/203; 709/219; 709/228; 709/227; 709/231; 709/232; 709/226; 370/252; 370/254; 370/338; 370/469; 370/389; 370/328
(58) Field of Classification Search ........... 709/201–205
See application file for complete search history.

(56) References Cited

U.S. PATENT DOCUMENTS

| | | | |
|---|---|---|---|
| 5,680,323 A | 10/1997 | Barnard | |
| 6,338,094 B1 | 1/2002 | Scott et al. | |
| 7,260,564 B1 * | 8/2007 | Lynn et al. ............................. | 1/1 |
| 2002/0089530 A1 * | 7/2002 | Markel .......................... | 345/719 |
| 2002/0091764 A1 | 7/2002 | Yale | |
| 2002/0105529 A1 | 8/2002 | Bowser et al. | |
| 2003/0237043 A1 | 12/2003 | Novak et al. | |
| 2004/0019497 A1 * | 1/2004 | Volk et al. ......................... | 705/1 |
| 2004/0045040 A1 | 3/2004 | Hayward | |
| 2005/0022127 A1 | 1/2005 | Meyers et al. | |
| 2005/0038717 A1 | 2/2005 | McQueen, III et al. | |
| 2005/0066339 A1 * | 3/2005 | Thoen ........................... | 719/328 |
| 2005/0198220 A1 * | 9/2005 | Wada et al. .................... | 709/220 |
| 2005/0273503 A1 | 12/2005 | Carr et al. | |
| 2005/0278371 A1 | 12/2005 | Funk et al. | |

OTHER PUBLICATIONS

RealOne Player Scripting Guide: Chapter 4: Embedded Environment (http://service.real.com/help/library/guides/realone/ScriptingGuide/HTML/realscript.htm).
Referencing SMIL Documents to Play on the Real Player in a Seperate Window Using a Hyperlink in a Web Page (http://cita.rehab.uiuc.edu/realmedia/web-smil.html).
APL and the Media (http://delivery.acm.org/10.1145/640000/637356/p6-waid.pdf?key1=637352&kay2=4361517411&coll=GUIDE&dl=GUIDE&CFID=70990088&CFTOKEN=62430234).

* cited by examiner

*Primary Examiner* — Jude Jean Gilles
(74) *Attorney, Agent, or Firm* — Shook, Hardy & Bacon LLP (57) ABSTRACT

A system, a method and computer-readable media for presenting video content within a web page. A client computer receives a web page over a network. The web page includes an item of script for use in presenting requested video content within the web page. Executing this item of script establishes a connection with a video player provider. Using this connection, video player code is loaded from the video player provider. This code is utilized to present the video player within the web page. The video player may present the requested video to the user.

20 Claims, 6 Drawing Sheets

PRESENTING VIDEO CONTENT WITHIN A WEB PAGE

BACKGROUND

The Internet has been popularized by the overwhelming and rapid success of the World Wide Web (WWW or Web). The Web facilitates interaction between users and the Internet through its billions of web pages. Web pages are documents that are accessible via the Internet and that provide content to users. These pages are typically written in code, such as HTML (HyperText Markup Language), or the like. The Web links together the multitude of web pages in a complex, non-sequential web of associations that permit a user to browse from one topic to another, regardless of the presented order of topics. A "web browser" (also known as an "Internet browser") is an application that executes on the user's computer to navigate the Web. The web browser allows a user to retrieve and render hypermedia content from the WWW, including text, sound, images, video and other data.

As the Internet has because more and more popular, so has the number of web pages. Indeed, even those with limited computer-expertise often create web pages. As creating a web page typically involves the generation of HTML code, novice users may find it difficult to integrate multi-media content into their pages. For example, today only the most technically savvy web page designer is able to integrate video content into a web page. This is because the ability to write the HTML code necessary for such an integrated presentation is beyond the capability and resources of inexperienced designers. Accordingly, only a limited number of web pages today provide a contextual presentation of video content.

The difficulties associated with providing multi-media content in web pages may also be observed when considering web pages that present blog content. A blog is a personal chronological log of a user's thoughts published on a web page. When a blog user (a "blogger") desires to comment on an item of video content, they may wish to provide information about the video in their blog. This information may include a thumbnail image from the video, a video caption and/or a link to the video. Today, incorporating such information into a blog may involve editing the blog site's HTML code, and, thus, such incorporation may be a tedious endeavor. Because bloggers often have limited experience in writing HTML code, they may find it difficult to incorporate content related to a video into their blog.

SUMMARY

The present invention provides systems and methods for presenting video content within a web page. A client computer receives a web page over a network, such as the Internet. The web page includes an item of script for use in presenting requested video content within the web page. For example, the user may request that a particular video clip be played. Executing the item of script establishes a connection with a video player provider. Using this connection, video player code is loaded from the video player provider. This code is utilized by the client computer to present the video player within the web page. For example, the video player may be incorporated into a contextual presentation within the web page. The present invention further provides systems and methods for posting content associated with a video on a web page. For example, the systems and methods may facilitate the population of the video's presentation on a destination web page such as a blog.

It should be noted that this Summary is provided to generally introduce the reader to one or more select concepts described below in the Detailed Description in a simplified form. This Summary is not intended to identify key and/or required features of the claimed subject matter, nor is it intended to be used as an aid in determining the scope of the claimed subject matter.

BRIEF DESCRIPTION OF THE SEVERAL VIEWS OF THE DRAWING

The present invention is described in detail below with reference to the attached drawing figures, wherein.

DETAILED DESCRIPTION

The subject matter of the present invention is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described.

Figure 1:
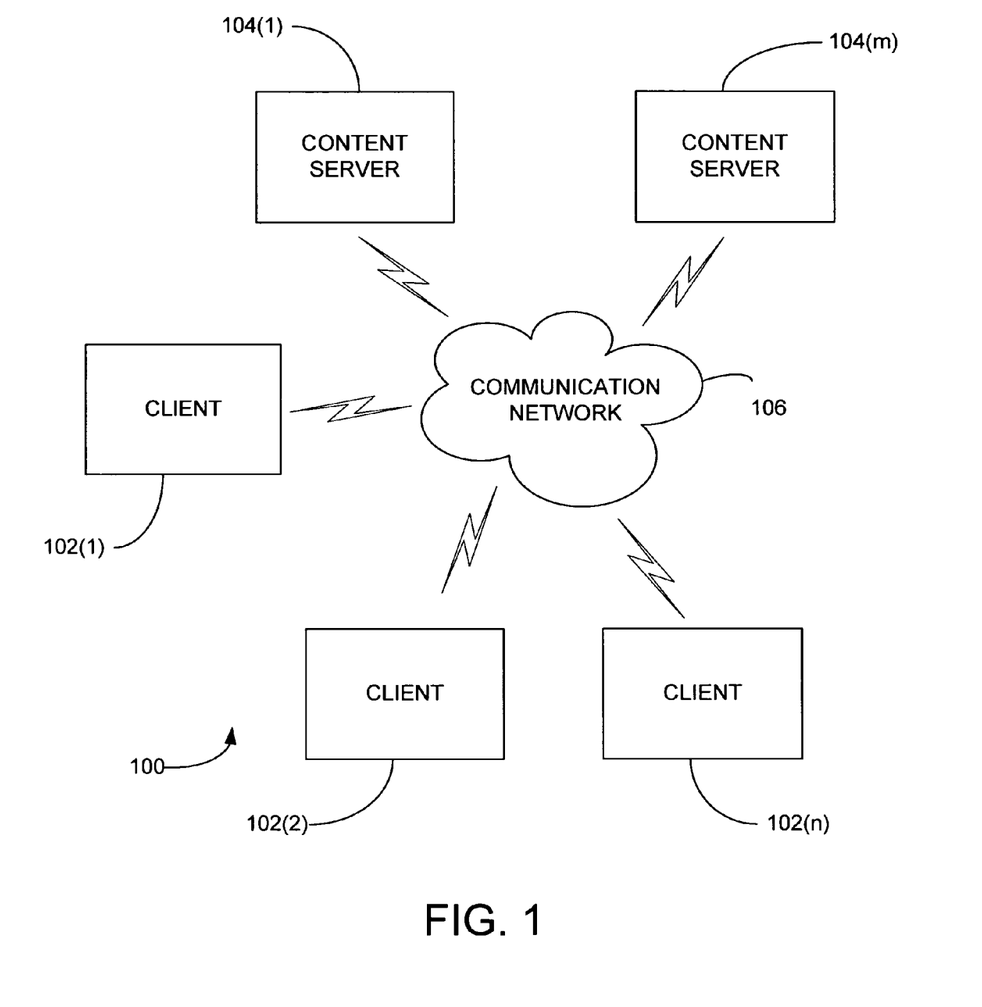
FIG. 1 is a block diagram of an exemplary network environment suitable for use in implementing embodiments of the present invention.

Referring initially to FIG. 1 in particular, an exemplary network environment for implementing the present invention is shown and designated generally as network environment 100. Network environment 100 is but one example of a suitable environment and is not intended to suggest any limitation as to the scope of use or functionality of the invention. Neither should the network environment 100 be interpreted as having any dependency or requirement relating to any one or combination of elements illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, specialty computing devices, servers, etc. The invention may also be practiced in distributed computing environments where tasks are performed by remote-processing devices that are linked through a communications network.

In the exemplary network environment 100, multiple (n) client computing devices 102(1), 102(2), . . . , 102(n) are coupled to multiple (m) content server computing devices 104(1), . . . , 104(m) via a communication network 106. Network 106 is intended to represent any of a variety of conventional network topologies and types (including optical, wired and/or wireless networks), employing any of a variety of conventional network protocols (including public and/or proprietary protocols). Network 106 may include, for example, the Internet as well as possibly at least portions of one or more local area networks (LANs) and/or wide area networks (WANs).

Requests from a client device 102 for content, such as a web page, that is available on a content server device 104 are routed from the client device 102 to the server device 104 via the network 106. For example, the client device 102 and the server devices 104 may communicate using a protocol such as Hypertext Transfer Protocol (HTTP), a protocol commonly used on the Internet to exchange information. The content server device 104 receives the request and returns the requested content to the client device 102 via the network 106. An application on the client device 102, such as a web browser, may be operable to present the received content to the user.

The computing devices 102 and 104 can each be any of a variety of conventional computing devices, including desktop PCs, notebook or portable computers, workstations, mainframe computers, Internet appliances, gaming consoles, handheld PCs, cellular telephones or other wireless communications devices, personal digital assistants (PDAs), combinations thereof, and so on. One or more of the devices 102 and 104 can be the same types of devices, or alternatively different types of devices.

The content server devices 104 can make any of a variety of data available to the clients 102. For example, the server devices 104 may provide streaming video to the clients 102. As used herein, "streaming media", "streaming video", "video content", "video clip", and any variation thereof generally includes audio/video content. The term "streaming" is used to indicate that the data representing the media content is provided over a network to a client device and that playback of the content can begin prior to the content being delivered in its entirety. The data may be publicly available or alternatively restricted (e.g., restricted to only certain users, available only if the appropriate fee is paid, etc.). The data may be any of a variety of one or more types of content, such as audio, video, text, images, animation, etc. Additionally, the data may be "on-demand" (e.g., pre-recorded and of a known size) or alternatively "broadcast" (e.g., having no known size, such as a digital representation of a concert being captured as the concert is performed and made available for streaming shortly after capture).

Figure 2:
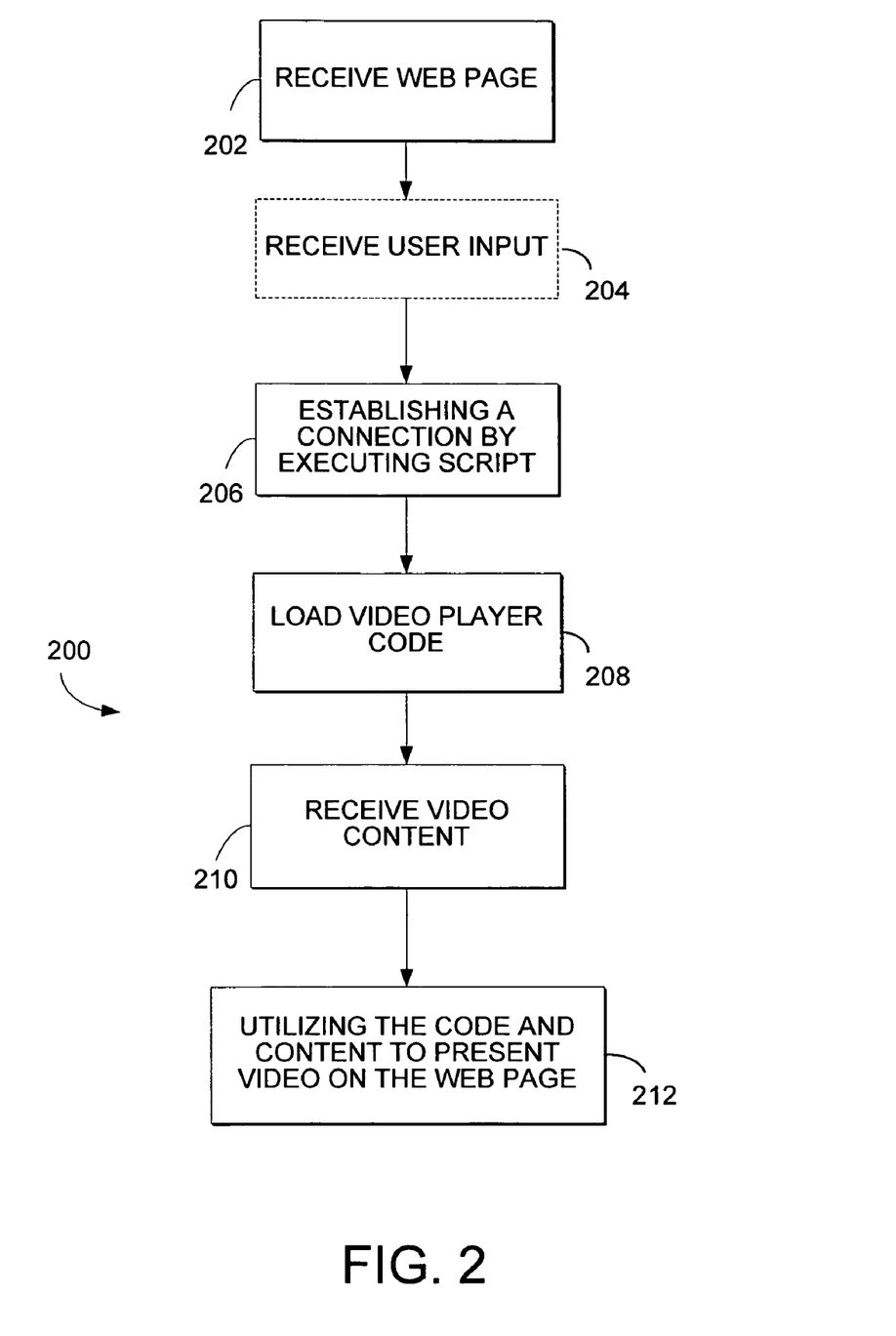
FIG. 2 illustrates a method in accordance with one embodiment of the present invention for presenting video content within a web page.

FIG. 2 illustrates a method 200 for presenting video content within a web page. At 202, the method 200 receives web page content over the Internet. For example, a user may utilize a computer connected to the Internet to browse various web pages. Any number of applications residing on the computer may aid in such browsing. In one embodiment, the received web page may incorporate video content. For instance, a web page may present a video clip in a contextual presentation on the page.

In order to present video content, the web page may include code to be executed on the user's computer. This code may be referred to as "script," and, in one embodiment, the script is written in JavaScript, a prototype-based scripting language. The script may execute automatically when the web page is loaded or may be executed in response to a user input. As will be appreciated by those skilled in the art, script embedded within a web page may enable a wide variety of operations to be performed.

Optionally, the method 200, at 204, receives a user input indicating a user's desire to view a clip of video content within the web page. For example, the web page may provide information about various video clips. A user may select to "Play" one of these clips. Alternatively, the method 200 may automatically present video content once the web page has loaded.

At 206, the method 200 establishes a connection with a video player provider by executing an item of script. For example, the script may be executed in response to a user input received at 204. The executing of this script may enable the providing of a video player within the web page. The script file need not contain all the code for presenting the video content. For example, the script may check that the technical requirements for the video player are met. If these requirements are met, the script may establish communication over the Internet with a video player provider. This video player provider may provide the actual code for spawning the video player within the web page. In this embodiment, the script establishes communication with another entity (i.e., the video player provider) on the Internet, and this entity provides the actual code for the video player.

The method 200, at 208, loads the video player code. The video player code may originate from the video player provider and may be communicated to the user's computer over the Internet. In one embodiment, execution of the web page's embedded script initiates a process in which the video player code is communicated to the user's computer. The video player code may be loaded as a script file, and this file may contain the functionality for generating the video player. Upon loading the video player code, the video player may be presented on the web page. In one embodiment, a variety of animations may accompany the presentation of the video player. For example, opening the video player may cause the previously displayed content on the web page to be moved down on the page. By providing the video player inline and not in a separate window, the player may be incorporated into a contextual presentation on the web page.

At 210, the method 200 receives the video content for presentation by the video player. A variety of techniques exist in the art for providing video content for presentation within a web page. For example, the video content may be streamed from a content provider to the user's computer. Upon receipt of the video content, the method 200 utilizes the video content to present the requested video content to the user in the video player at 212. As will be appreciated by those skilled in the art, by loading the video player code from a separate entity, the web site provider need not posses the ability to write or understand the code for integrating/including a video player with a web page.

Figure 3:
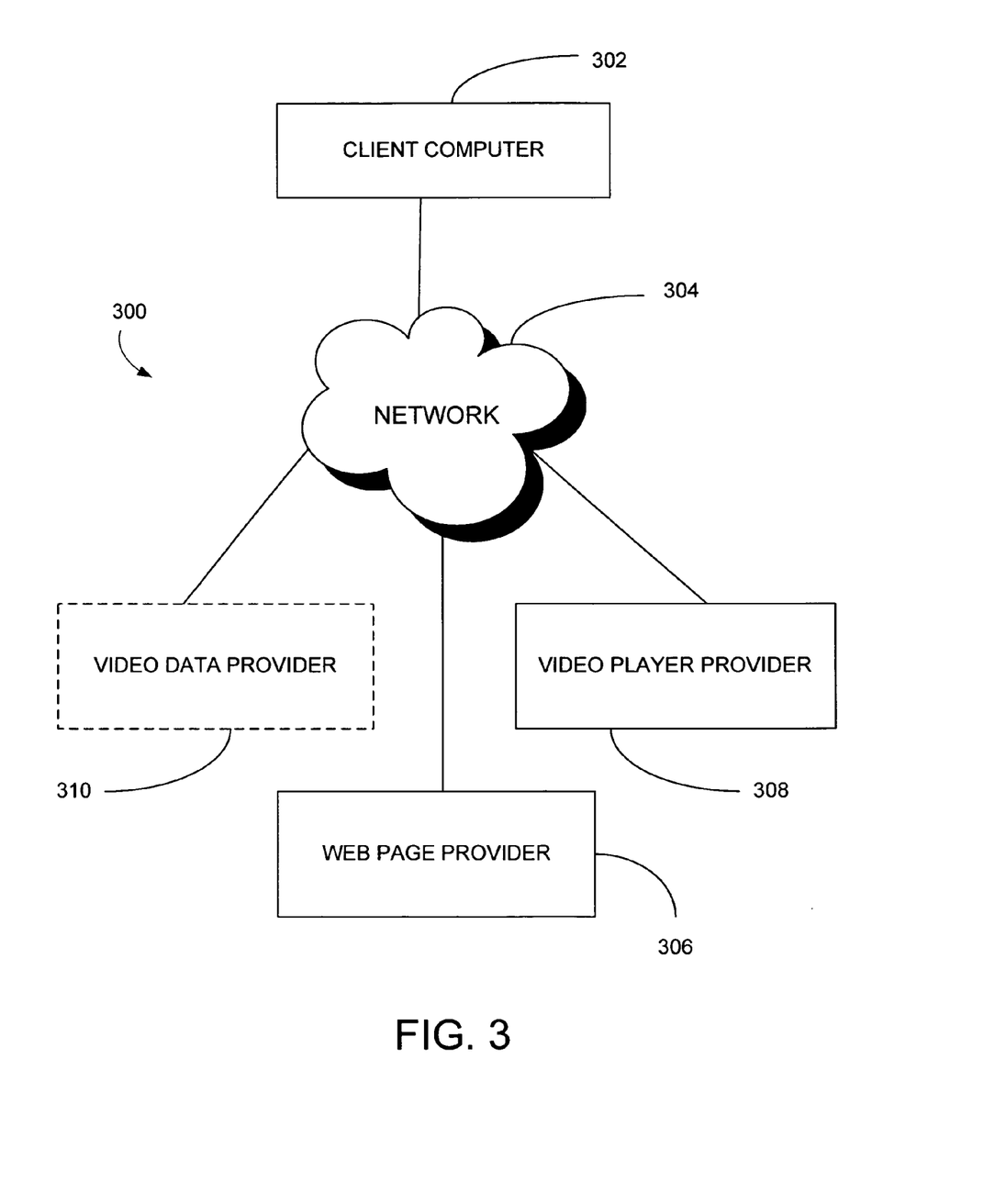
FIG. 3 illustrates a system in accordance with one embodiment of the present invention for providing a video player that presents video content on a web page.

FIG. 3 illustrates a system 300 for providing a video player that presents video content within a web page. The system 300 includes a client computer 302. The client computer 302 may be any number of computing devices. For example, the client computer 302 may be a desktop computer, a laptop computer or a mobile computing device, such as a PDA or a cell phone. The client computer 302 is in communication with a network 304. The network 304 may be the Internet or an intranet, and the client computer 302 may have a wired or wireless connection with the network 304. The client computer 302 may be configured to access a variety of content available via the network 304. For example, the client computer 302 may include web-browsing software for displaying web pages to a user. A variety of web browsing applications and interfaces are known in the art, and such applications and interfaces may vary based upon the type of computing device being utilized.

The system 300 also includes a web page provider 306. The web page provider 306 may be configured to make a web page available over the network 304. In one embodiment, the client computer 302 initiates a connection with the web page provider 306 via the network 304. For example, a user of the client computer 302 may request to view a web page by entering a Uniform Resource Locator (URL) into a web browsing application. A URL is an address indicating the virtual location of a web site or document on the World Wide Web. After submission of the URL, a connection between the client computer 302 and the web page provider 306 may be established, and data associated with the requested web page may be communicated to the client computer 302. A variety of information and data may be provided by the web page provider 306 so as to allow presentation of a web page on the client computer 302. For example, the web page content may include code defining the visual attributes of the web page. This code, for example, may be formatted in accordance with the HTML or XML languages. The web page content may also include executable code. This code, known as script, may be executed on the client computer 302 and may provide a variety of functionality associated with a web page. For example, execution of a script file may enable the presentation of video content within a web page.

In one embodiment, the web page content communicated by the web page provider 306 contains a script file that, when executed, enables a contextual presentation of video content within the web page. The script file need not contain all the code for presenting the video. In one embodiment, execution of the script file checks for minimum system requirements and initiates communication between the client computer 302 and a video player provider 308 over the network 304.

The video player provider 308 may be an entity in the system 300 that provides the code associated with a video player. For example, the web page provider 306 may not distribute the actual code for the web page's video player. This code may be provided by the video player provider 308. In one embodiment, the script provided by the web page provider 306 is executed on the client computer 302 in response to a user input requesting that a particular item of video be presented within the web page. Execution of the script may include a variety of function calls that enable the pulling of the appropriate video player code from the video player provider 308. The video player code may be provided in a script file that defines the functionality of the player. Execution of this code on the client computer 302 may generate the video player within the web page.

As will be appreciated by those skilled in the art, by allowing the web page provider 306 to provide the video player code, the web page provider 306 need not alter the web page's content when the video player code is updated. This provides flexibility and may allow a web page provider that is not technically-savvy to offer video content with the web page. In one sense, the video player is a service offered by the video player provider 308. This service may be leveraged by the video player provider 308 to maintain control over the content presented by the video player. For example, the video player provider 308 may use the video player to present advertising content. Further, the video player code may enable functionality such as play lists, presentation of advertisements and tracking/reporting.

To present the video player in a contextual presentation on the web page, the HTML defining the web page may dictate how the player should appear on the page. A variety of animations may be selected so as to integrate the video player into the web page. Once the video player is presented, the requested video may be played. In one embodiment, the video content is received from a video data provider 310, which is an optional element to the system 300. A content identifier may be placed in a function call that creates the video player, and the video player code may then pull the video data from the video data provider 310 by utilizing this content identifier. In this manner, the video data is provided via the network 304 from the video data provider 310 to the client computer 302 for presentation. Thus, by utilizing code and content from the various entities in the system 300, the user is presented the requested video in a contextual presentation on the web page.

Figure 4:
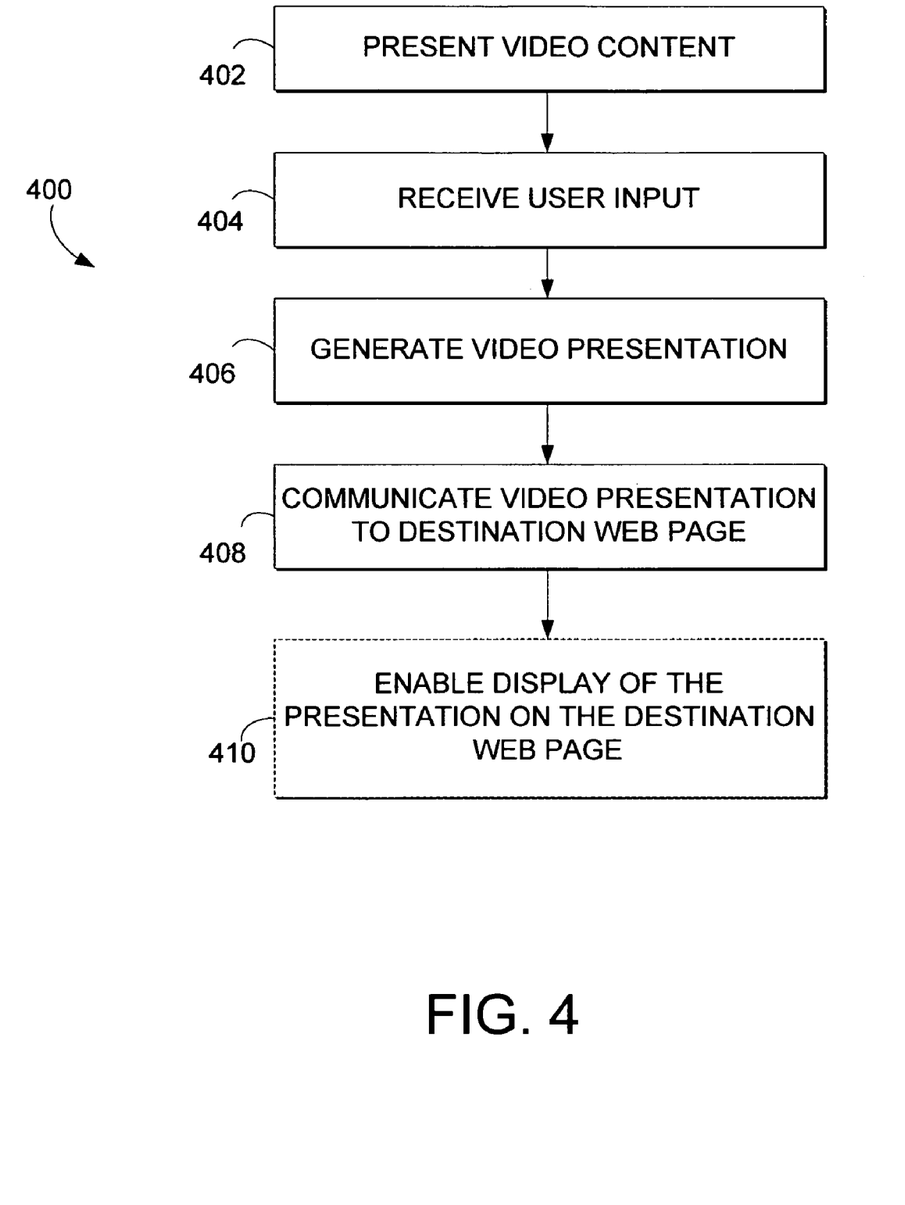
FIG. 4 illustrates a method in accordance with one embodiment of the present invention for posting content associated with a video on a web page.

FIG. 4 illustrates a method 400 for posting content associated with a video on a web page. The method 400, at 402, presents content associated with an item of video content. In one embodiment, a web page may provide access to a variety of video clips. For example, a web page dedicated to providing news content may provide video clips related to recent news stories. A user may select to view a video clip of interest, and the web page may play the selected video. As an example, to present content associated with a video, a web page may present a frame from the video as a "tease image." The web page may also present information describing the video, such as the video's title and/or a caption describing the subject matter depicted in the video.

At 404, the method 400 receives a user input selecting to post a presentation associated with an item of video content on a destination web page. In one embodiment, a web page presenting video content includes a button for selection when a user desires to populate a destination web page with a presentation describing a presented video. For example, a user may see video content on the web page and may desire to write a blog entry about this video. Further, the user may wish to encourage others to view the video, and the user may desire to provide commentary about the video. To populate the destination site with a presentation related to the video, the user may select the aforementioned button. In one embodiment, the user input is a single input (e.g., one mouse click) to a visual element (e.g., a button). As will be appreciated by those skilled in the art, a variety of user interfaces and user inputs may be acceptable for indicating a user's selection to post a presentation associated with an item of video on a destination web page.

The method 400, at 406, generates a presentation for the selected video. The presentation may include any content appropriate for depicting the video. Examples of such content include the video's title, a caption and an image/frame from the video. Also the presentation may include a link to a web page where one may play the video. In sum, any number of visual elements may be appropriate for the generated presentation. Further, the presentation may be tailored based on the destination site. For example, the presentation may be designed to be appropriate for posting within a blog site. In one embodiment, the presentation is generated from metadata associated with the video. When a user requests to post the presentation on a destination web page, this metadata is gathered and is used to generate HTML code or other structured data. This code/data may define the various attributes of the video's presentation, as they should appear on the destination web page.

At 408, the method 400 communicates the video presentation to the destination web page. For example, the provider of the destination page may have an interface configured to receive the HTML code or data defining the presentation. In one embodiment, the method 400 may require the user to input the address of the destination web page. Subsequently, the user may provide authentication credentials to prove authorization to edit the destination web page. Alternatively, the method 400 may automatically authenticate a user to the destination web page. For example, the user may already have submitted the necessary credentials for their blog site. In this example, the user need not be prompted for either the destination web page or for credentials. The method 400 may automatically locate the blog site and communicate the video presentation to this site.

Once the video presentation is communicated to the destination web page, the method 400 optionally enables display of the presentation on the destination web page at 410. As previously mentioned, the provider of the destination web page may have an interface configured to receive the HTML code or data defining the presentation. Accordingly, this code/information may be used by this provider to edit the HTML code defining the destination web page. The code may be inserted into the page's HTML code. Further processing may also be necessary when adding the presentation to the destination web page. Once the HTML code defining the destination web page has been edited, the destination web page will include a presentation for the selected video. As will be appreciated by those skilled in the art, the method 400 may facilitate the population of the video's presentation on the destination web page and does not require that a user personally edit or write HTML code.

Figure 5A:
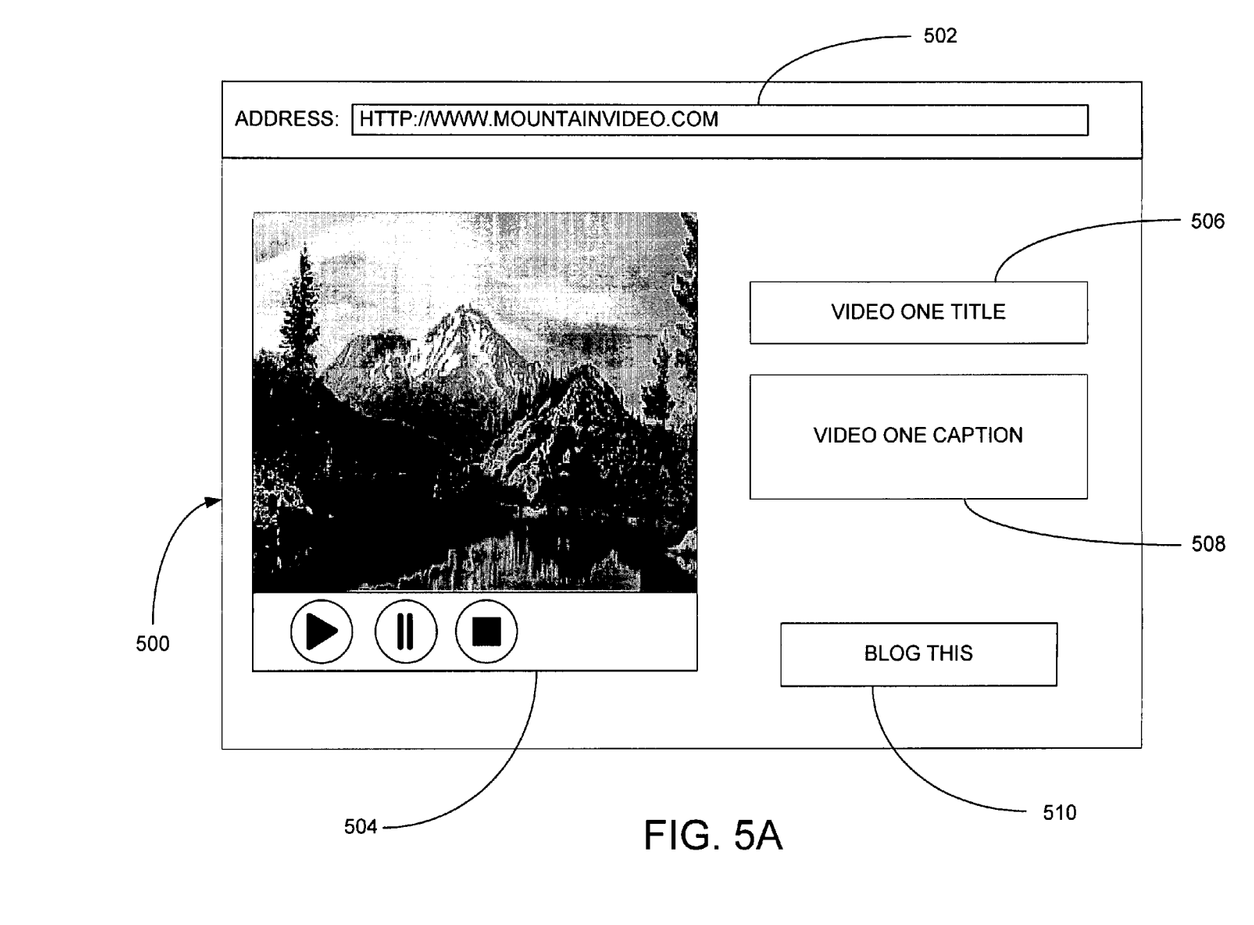
FIGS. 5A and 5B are screen displays of a graphical user interface in accordance with one embodiment of the present invention in which video content is presented to a user.
Figure 5B:
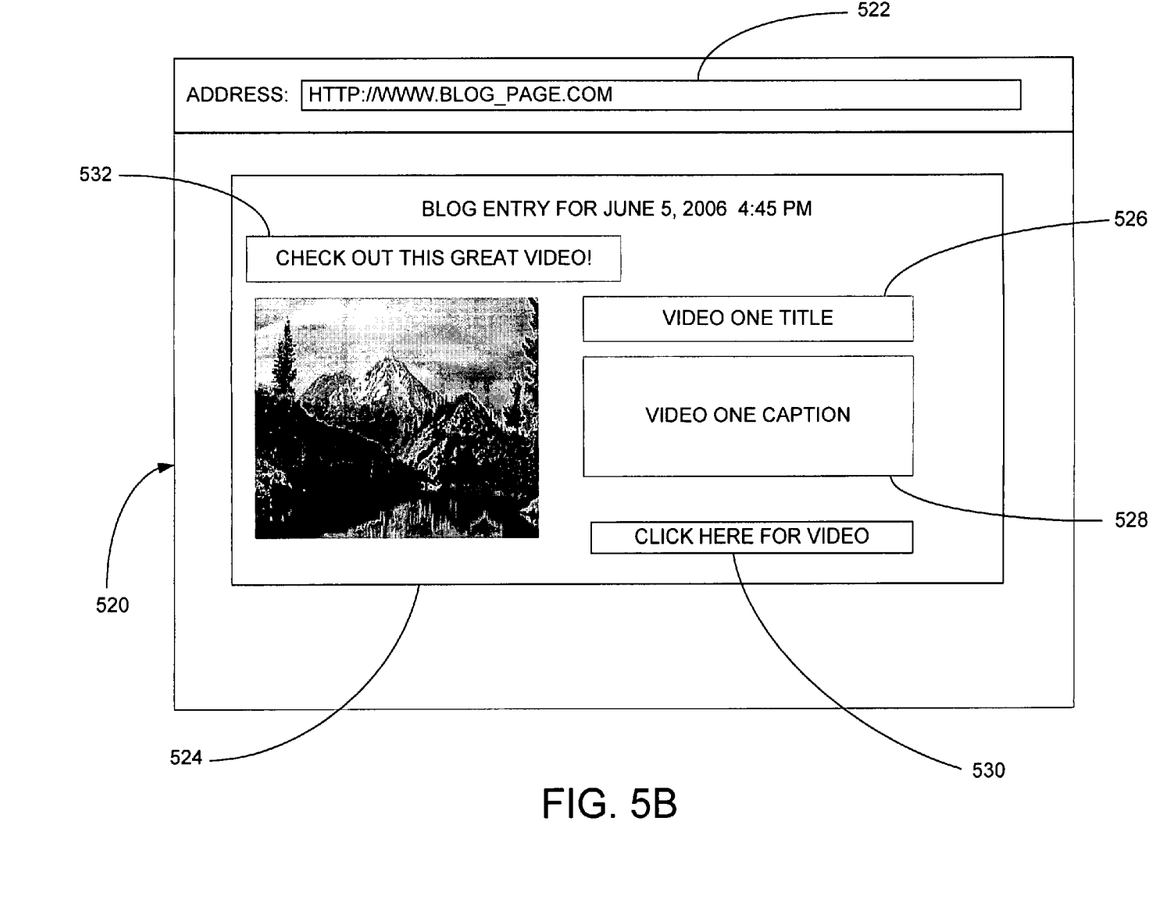

FIGS. 5A and 5B present screen displays, which provide exemplary screen views in accordance with one embodiment of the present invention. Turning to FIG. 5A, a screen display 500 illustrates a user interface provided by a web browser. As indicated by an address area 502, the screen display 500 is currently displaying a web page having the URL of www-.mountainvideo.com. The screen display 500 includes a video presentation area 504. The video presentation area 504 may present a video clip in response to a user input. The screen display 500 also includes a video title presentation area 506 and a video caption area 508. As will be appreciated by those skilled in the art, a variety of content may be presented along with a video on a web page.

The screen display 500 also includes a "Blog This" button 510. The button 510 may be selected when a user desires to populate their blog site with a presentation associated with the video presented in the video presentation area 504. The button 510 may alternately read "Blog to My MSN Space" and may be configurable for different markets. The interface may also include other elements allowing a user to indicate a desire to populate their blog site with content related to the video. For example, the user may be presented the option to blog a piece of content in response to a left mouse click. In this example, a contextual menu including the option to populate the blog site with content relevant to the video may be presented. In one embodiment, a method such as the method 400 of FIG. 4 may be performed to enable this alteration of the blog site.

FIG. 5B illustrates a screen display 520 for a blog site that has been populated with a presentation associated with the video presented in the video presentation area 504 of FIG. 5A. As indicated by an address area 522, the screen display 520 is currently displaying a web page having the URL of www-.blog_page.com. The screen display 520 includes a blog entry 524 that is titled "BLOG ENTRY FOR JUN. 5, 2006 4:45 PM." The blog entry 524 may have been automatically created in response to user selection of the "Blog This" button 510 of FIG. 5A. Accordingly, the blog entry 524 includes a presentation relating to the video from www.mountainvideo-.com. For instance, the blog entry 524 includes a title area 526, which presents the video's title. Also the blog entry 524 includes a caption 528 and a link 530, which allows the user to visit www.mountainvideo.com to view the video. Additionally, the user's blog comments/commentary are displayed in an area 532. As will be appreciated by those skilled in the art, the user may define and edit a variety of aspects of the presentation. For example, before the video content is posted on the blog site, the user may be presented an interface to edit the blog entry. By automatically populating the blog entry 524 with content relevant to the selected video, the user may easily create blog entries discussing videos of interest.

Alternative embodiments and implementations of the present invention will become apparent to those skilled in the art to which it pertains upon review of the specification, including the drawing figures. Accordingly, the scope of the present invention is defined by the appended claims rather than the foregoing description.

The invention claimed is:

1. A computer-implemented method for presenting video content within a web page, said method comprising:
   receiving a web page over a network, wherein said web page includes an item of script for providing a contextual presentation of an item of video content, wherein said item of script, when executed, establishes a network connection between a user's computer and a video player provider and instructs said video player provider to provide code defining a video player for presenting said item of video content within said web page;
   establishing said network connection with said video player provider by executing said item of script;
   incident to execution of said item of script, loading video player code from said video player provider via said network connection, wherein said video player code defines a video player to be embedded within the presentation of said webpage, wherein the video player is not installed on said user's computer prior to execution of the item of script; and
   utilizing at least a portion of said video player code to present said video player embedded within said web page, wherein at least a portion of said item of video content is presented by said video player.

2. The method of claim 1, wherein said web page is received from a web page provider.

3. The method of claim 2, wherein said video player provider is associated with a first domain on the Internet, and wherein the web page provider is associated with a second domain on the Internet.

4. The method of claim 1, wherein said establishing is responsive to a user input selecting to play said item of video content.

5. The method of claim 1, wherein said video player is presented within a window presenting said web page.

6. The method of claim 1, wherein said video player includes a playlist that lists at least said item of video content.

7. One or more hardware-implemented computer-readable media having computer-useable instructions embodied thereon to perform the method of claim 1.

8. A system for providing a video player that presents video content on a web page, said system comprising:
   a video player provider configured to provide code for generating a video player embedded within a web page;
   a web page provider configured to provide said web page, wherein said web page includes executable script that, when executed, establishes a network connection with said video player provider and instructs said video player provider to provide said code defining a video player to be embedded within the display of said web page; and a client computer configured to receive said executable script from said web page provider and to receive, via an Internet connection established through execution of said executable script, at least a portion of said code from said video player provider, wherein said client computer is further configured to present said video content by utilizing at least a portion of said code to present said video player embedded within the presentation of said web page without the use of a preloaded video player or a preloaded video-player browser plug-in.

9. The system of claim 8, wherein said video player provider is associated with a first domain on the Internet, and wherein the web page provider is associated with a second domain on the Internet.

10. The system of claim 8, wherein said client computer is configured to execute said executable script in response to user selection to view an item of video content.

11. The system of claim 8, wherein said system further comprises a video data provider configured to communicate video data to said client computer for presentation by said video player.

12. The system of claim 8, wherein said client computer is configured to utilize a web browsing application to present said video player within said web page.

13. The system of claim 8, wherein said client computer is configured to present said video player inline on said web page.

14. One or more hardware-implemented computer-readable media having computer-useable instructions embodied thereon to perform a method for posting content associated with a video on a web page, said method comprising:

presenting one or more items of video content to a user;

receiving a user input selecting to post a presentation associated with a selected item of video content on a destination web page;

generating structured data defining said presentation in response to said user input, wherein said structured data includes a content identifier identifying the selected item of video content and an item of script that, when executed, establishes a network connection to a video player provider allowing communication of video player code defining a video player to be embedded into said destination webpage; and communicating said structured data to an interface associated with said destination web page so as to allow presentation of said selected item of video content within said destination web page upon execution of said item of script and by utilizing the content identifier to request the selected item of video content from a video content provider, wherein said presentation of said selected item of video content does not rely on a video player or a video-player browser plug-in installed on the user's computer prior to execution of the item of script.

15. The media of claim 14, wherein said one or more items of video content are presented on a web page, and wherein said user input is made by user selection of a visual element presented on said web page.

16. The media of claim 14, wherein said destination web page includes a blog.

17. The media of claim 16, wherein said user input indicates a user's desire to post said presentation on said blog.

18. The media of claim 14, wherein said method further comprises utilizing said structure data to place said presentation on said destination web page.

19. The media of claim 14, wherein said presentation includes at least one of a thumbnail, a caption and a headline associated with at least one of said one or more items of video content, and wherein said thumbnail has one or more hyperlinks to enable presentation of said one or more items of video content 20. The media of claim 14, wherein said method further comprises communicating credentials indicating said user is authorized to add said presentation to said destination web page.

\* \* \* \* \*